(12) United States Patent
Chung et al.

(10) Patent No.: US 8,634,527 B2
(45) Date of Patent: Jan. 21, 2014

(54) METHOD AND APPARATUS FOR DETECTING NETWORK AND SERVICE PERFORMANCE DEGRADATIONS USING CALL DETAIL RECORDS

(75) Inventors: Li-Jin Chung, Lincroft, NJ (US); Richard Farel, Englishtown, NJ (US); Yu-Lein Kung, Holmdel, NJ (US); Alek Remash, Princeton, NJ (US); James A. Schmitt, Little Silver, NJ (US); Ching-Chyuan Shieh, Princeton, NJ (US); Jeffrey Stein, Cliffwood, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1270 days.

(21) Appl. No.: 12/136,379

(22) Filed: Jun. 10, 2008

(65) Prior Publication Data
US 2009/0304165 A1    Dec. 10, 2009

(51) Int. Cl.
*H04M 15/00*    (2006.01)
(52) U.S. Cl.
USPC .................. 379/126; 379/114.04; 714/46

(58) Field of Classification Search
USPC .......... 379/112.06, 126, 133, 114.14, 121.01, 379/127.02, 145, 1.01, 9.03, 14.01, 22.03, 379/29.08, 114.04; 370/338; 706/25; 714/46, 48, 49, 52; 700/26, 27
See application file for complete search history.

(56) References Cited

U.S. PATENT DOCUMENTS

| | | | | |
|---|---|---|---|---|
| 7,609,826 | B2 * | 10/2009 | Liu et al. | 379/126 |
| 2005/0047569 | A1 * | 3/2005 | Moisey et al. | 379/126 |
| 2006/0274703 | A1 * | 12/2006 | Connelly | 370/338 |
| 2008/0288427 | A1 * | 11/2008 | Barson et al. | 706/25 |

* cited by examiner

*Primary Examiner* — Md S Elahee (57) ABSTRACT

A method and apparatus that employ the use of CDRs to effectively monitor and proactively respond to network or service events that impact performance within a network are disclosed. For example, the method receives a plurality of call detail records (CDRs), wherein each of the plurality of call detail records comprises a plurality of fields. The method determines a n-field rule signature from each of the call detail records (CDRs), and analyzes the n-field rule signatures from the plurality of call detail records (CDRs) for detecting at least one network performance problem.

20 Claims, 6 Drawing Sheets

METHOD AND APPARATUS FOR DETECTING NETWORK AND SERVICE PERFORMANCE DEGRADATIONS USING CALL DETAIL RECORDS

The present invention relates generally to communication networks and, more particularly, to a method and apparatus for detecting network and service performance degradations using Call Detail Records in communication networks, e.g., packet networks such as Voice over Internet Protocol (VoIP) networks.

BACKGROUND OF THE INVENTION

Although Voice over Internet Protocol (VoIP) technology has been in the market for several years, the availability of features and capabilities in the area of service assurance is still lacking or in its infancy. In order to support service assurance by a service provider, VoIP service providers need to consider creative use of existing features and capabilities to help enhance general network and service performance, reliability, and maintenance automation. Call Detail Records (CDRs) containing information about calls being processed in a VoIP network are generated by various VoIP network elements. CDRs are records typically used by a service provider for billing purposes.

SUMMARY OF THE INVENTION

In one embodiment, the present invention discloses a method and apparatus that employ the use of CDRs to effectively monitor and proactively respond to network or service events that impact performance within a network. For example, the method receives a plurality of call detail records (CDRs), wherein each of the plurality of call detail records comprises a plurality of fields. The method determines a n-field rule signature from each of the call detail records (CDRs), and analyzes the n-field rule signatures from the plurality of call detail records (CDRs) for detecting at least one network performance problem.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although Voice over Internet Protocol (VoIP) technology has been in the market for several years, the availability of features and capabilities in the area of service assurance is still lacking or in its infancy. Call Detail Records (CDR) containing information about calls being processed in a VoIP network are generated by VoIP network elements and can be a useful tool to enhance VoIP network and service performance, reliability, and maintenance automation. CDRs are records typically used by a service provider for billing purposes but they contain information that can also be used for other network management purposes, such as performance management.

In one embodiment, the present invention enables the use of CDRs to effectively monitor and proactively respond to network or service events that impact performance within a network. Information embedded within CDRs are extracted and analyzed to detect network and service performance problems. Fields contained within CDRs such as, but not limited to, record type, release code, call direction, calling party number, called party number, and disconnect initiator can be used to derive information about the state of the network and, therefore, be used to identify performance impacting events. The definition of the aforementioned CDR fields will be provided below. Different signatures representing distinct performance impacting network problems or events can be identified using different combinations of CDR fields for network problem identification purposes. In one embodiment, the present invention uses n-field rule signatures, i.e., signatures comprising n fields from a CDR, to identify performance issues and produce performance alert to enhance automated network management, especially performance management, of a VoIP network.

Figure 1:
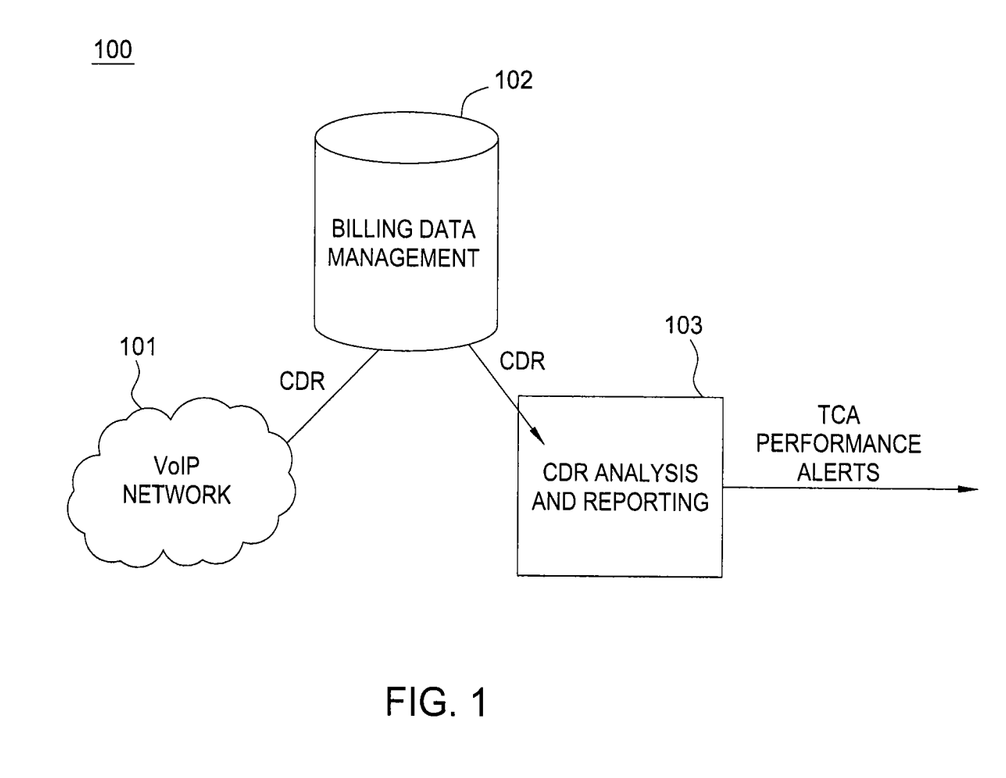
FIG. 1 illustrates an exemplary end-to-end Call Detail Record (CDR) analysis flow in a Voice over Internet Protocol (VoIP) network related to the present invention.

To better understand the present invention, FIG. 1 illustrates an exemplary end-to-end Call Detail Record (CDR) analysis flow in a packet network, such as a Voice over Internet Protocol (VoIP) network, related to the present invention. In FIG. 1, network elements in VoIP network 101 produce CDRs when calls are being processed. These CDRs are forwarded to a Billing Data Management module 102 for storage and processing related to billing purposes. However, since these CDRs can be used for performance management purposes in addition to billing purposes, the CDRs are also sent to CDR Analysis and Reporting module 103 for processing related to performance management purposes. For example, the CDRs are sent by the Billing Data Management module 102 to the CDR Analysis and Reporting module 103 on a periodic basis using a predefined time interval between transmissions set by the network operator. For instance, in one embodiment, the collected CDRs are transmitted every 5 minutes to the CDR Analysis and Reporting module 103.

CDR Analysis and Reporting module 103 uses the received CDRs to identify performance related problems in VoIP network 101 using predefined performance monitoring signature created by the network operator. Each distinct signature is created using a combination of a distinct combination of CDR fields, also known as n-field rule signature, depending of the type of performance problem being monitored. In general, an n-field rule signature is a signature comprising n different fields extracted from a CDR. The network operator configures thresholds for each distinct performance monitoring signature or n-field signature.

In one embodiment, two types of thresholding are used to evaluate network performance by the CDR Analysis and Reporting module 103. One type of thresholding, single interval thresholding, is based on CDR performance monitoring data received within a single 5-minute interval. For example, if a particular n-field rule signature exceeds its associated predefined threshold in a 5 minute interval, then a threshold crossing alert (TCA) performance alert will be created by CDR Analysis and Reporting module 103. Similarly, if a particular performance monitoring signature is below its associated predefined threshold in a single 5-minute intervals, the existing threshold crossing alert (TCA) performance alert will be cleared by the CDR Analysis and Reporting module 103 to indicate the previously identified problem no longer exists.

The second type of thresholding, persistence thresholding, is based on CDR performance monitoring data received across multiple counts of a predefined time period, e.g., 5-minute intervals. The count of predefined time interval is known as a successive alert count parameter which is configured by the network operator. For example, if a particular n-field signature exceeds its associated predefined threshold in a successive number of 5-minute intervals defined in its associated successive alert count parameter, then a threshold crossing alert (TCA) performance alert will be created by the CDR Analysis and Reporting module 103. Similarly, a user configurable successive clear count parameter can be defined to clear existing TCA alerts. For instance, if a particular performance monitoring signature remains below its associated predefined threshold in a successive number of 5-minute intervals defined in its associated successive clear count parameter, then the existing threshold crossing alert (TCA) performance alert will be cleared by the CDR Analysis and Reporting module 103 to indicate the previously identified problem no longer persists.

In one embodiment, the CDR fields analyzed by the CDR Analysis and Reporting module 103 include, but are not limited to, record type, release code, call direction, calling party number, called party number, and disconnect initiator.

The record type represents the type of a CDR. For example, there are two different record types: attempt type and stop type. In one embodiment, the attempt type presents a CDR record that is generated during the initiation of a call, and the stop type presents a CDR record that is generated when a call is terminated by the network.

The release code field provides a numerical code representing the final status of a call attempt. For example, illustrative release codes may comprise: "2"=No route to specified network, "3"=No route to destination, "4"=Send special information tone, "5"=Misdialed trunk prefix, "6"=Channel unacceptable, "7"=Call awarded, "8"=Preemption, "9"=Preemption-Circuit reserved, "16"=Normal route clearing, and "17"=User busy. It should be noted that this example list of release codes is only illustrative and should not be interpreted as a limitation on the present invention. The service provider may define any number of release codes to indicate any number of conditions as to final status of a call attempt.

The call direction field indicates the direction of a call. For example, the valid directions of a call may include:
 a on net to off net
 off net to on net
 on net to on net
 a off net to off net
For example, "on net to off net" indicates a direction where a customer (on net) of a service provider initiates a call from the service provider's network to a non-customer (off net) of the service provider. Specifically, the non-customer is on another network, e.g., a regular PSTN. Similarly, "off net to on net" indicates a direction where a non-customer (off net) of a service provider initiates a call to a customer of service provider's network (on net). In another example, "on net to on net" indicates a call between two customers of the same service provider. Finally, "off net to off net" indicates a call between two non-customers of the service provider that may have traverse over the service provider's network.

The calling party number field is the phone number of the calling party. The called party number field is the phone number of the called party.

The disconnect initiator field indicates the originator that disconnects a call, such as a network element, a calling party, or a called party.

Note that a CDR field can either be directly extracted from a CDR or derived from one or more fields within the CDR.

Figure 2:
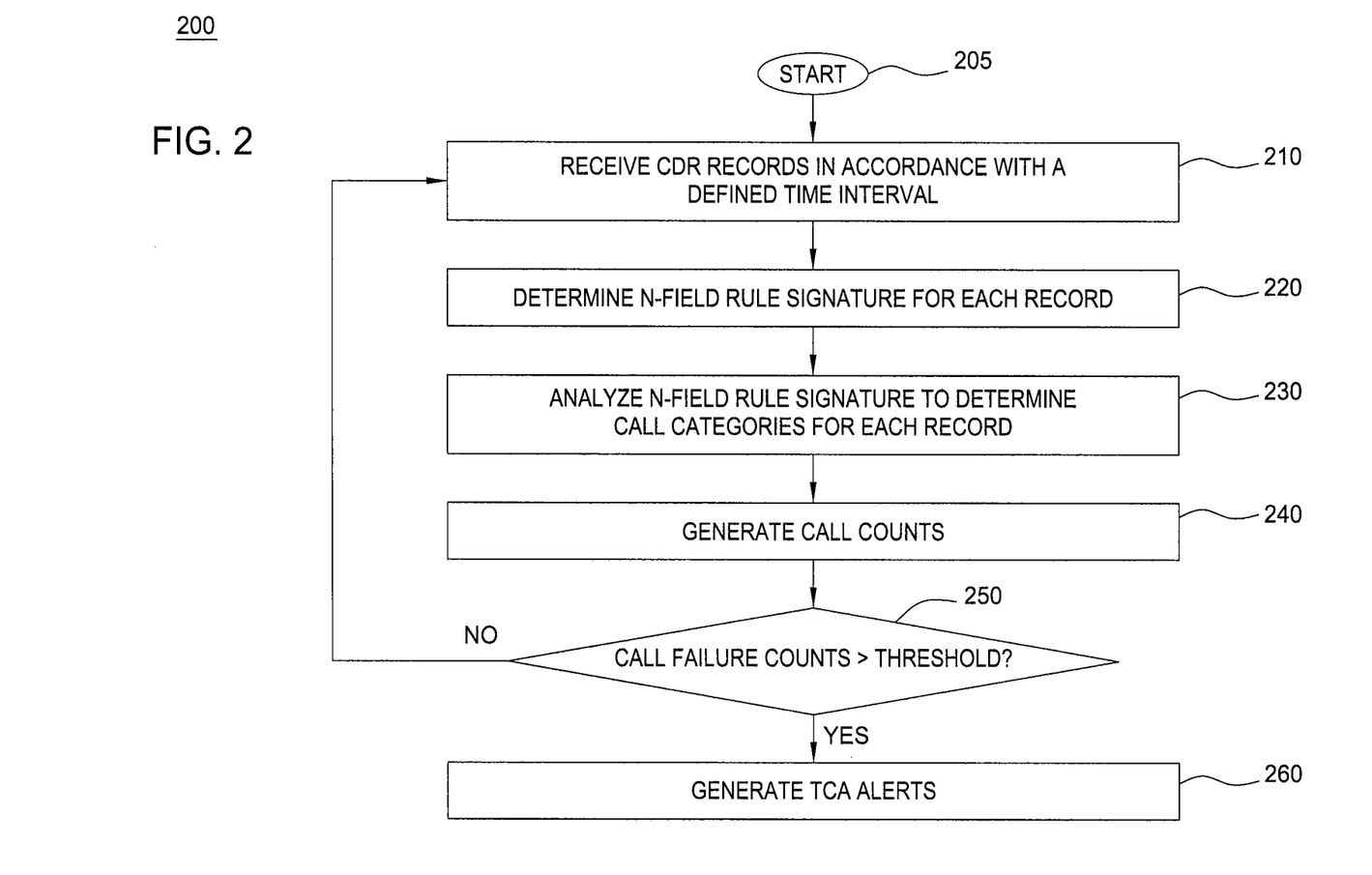
FIG. 2 illustrates a flowchart of a method for detecting network and service performance degradations using CDR in a packet network, e.g., a VoIP network, of the present invention.

FIG. 2 illustrates a flowchart of a method for detecting network and service performance degradations using CDRs in a packet network, e.g., a VoIP network, of the present invention. Method 200 starts in step 205 and proceeds to step 210.

In step 210, the method receives CDRs from the billing data management module on a periodic basis, e.g., in accordance with a defined time interval, such as every 5 minutes. The CDRs are received by the CDR Analysis and Reporting module.

In step 220, the method determines or obtains the fields, also known as n-field rule signature, within the received CDR to be used for performance monitoring analysis. N-field rule signature represents a set of n CDR fields to be used for a particular performance monitoring analysis scenario. In general, different n-field rule signatures represent different performance monitoring scenarios being analyzed. In one embodiment, the CDR fields analyzed by the method may include record type, release code, call direction, calling party number, called party number, and disconnect initiator fields. Three different scenarios using three different n-field rule signatures for performance monitoring purposes will be illustrated in FIG. 3, FIG. 4, and FIG. 5.

In step 230, the method analyzes the n-field rule signature to determine the call category for each CDR record. For example, the method analyzes the set of fields specified by the n-field rule signature to determine if:
 the call rings with no answer (RNA)
 the called party is busy (BUSY)
 the call has been blocked with defined cause (BLOCKED)
 the call has been cut off with defined cause (CUTOFF)
 the call has been blocked with undefined cause (UNDEFINED BLOCKED)
 the call has been cut off with undefined cause (UNDEFINED CUTOFF)
 the call has been completed successfully (SUCCESSFUL)

In step 240, the method generates the following set of call related counts, i.e., the call counts, including:
 total call attempts
 total successful calls (successful calls excluding RNA and BUSY)
 total successful call attempts (successful calls including RNA and BUSY)
 a total number of RNA calls
 total number of BUSY calls
 total number of BLOCKED calls
 total number of CUTOFF calls
 total number of UNDEFINED BLOCKED calls
 total number of UNDEFINED CUTOFF calls In step 250, the method determines if the n-field rule signature being analyzed exceeds its associated threshold. The first type of thresholding, single interval thresholding, is based on CDR performance monitoring data received within a defined time interval, e.g., a single 5-minute interval. The second type of thresholding, persistence thresholding, is based on CDR performance monitoring data received across multiple counts of predefined time intervals, e.g., 5-minute intervals. The count of predefined time intervals is known as successive alert count parameter which is configured by the network operator.

If the n-field rule signature being analyzed exceeds its associated threshold, the method proceeds to step 260; otherwise, the method proceeds back to step 210.

In step 260, the method generates a TCA performance alert accordingly. For example, if a particular performance monitoring signature, or n-field rule signature, exceeds its associated predefined threshold in a 5 minute interval, a threshold crossing alert (TCA) performance alert will be created by the method. Similarly, if a particular performance monitoring signature, or n-field rule signature, is below its associated predefined threshold in a single 5-minute intervals, then the existing threshold crossing alert (TCA) performance alert will be cleared by the method. In addition, if a particular performance monitoring signature exceeds its associated predefined threshold in a successive number of 5-minute intervals defined in its associated successive alert count parameter, then a threshold crossing alert (TCA) performance alert will be created by the method. Similarly, a user configurable successive clear count parameter can be defined to clear existing TCA alerts. For instance, if a particular performance monitoring signature remains below its associated predefined threshold in a successive number of 5-minute intervals defined in its associated successive clear count parameter, then the existing threshold crossing alert (TCA) performance alert will be cleared by the method.

In one embodiment, the issued TCA performance alert can be sent to a customer informing the customer of the problem, to a network operations center for further evaluations of potential impacts of the problem to the network, or to a network maintenance organization to repair the identified problem.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

Figure 3:
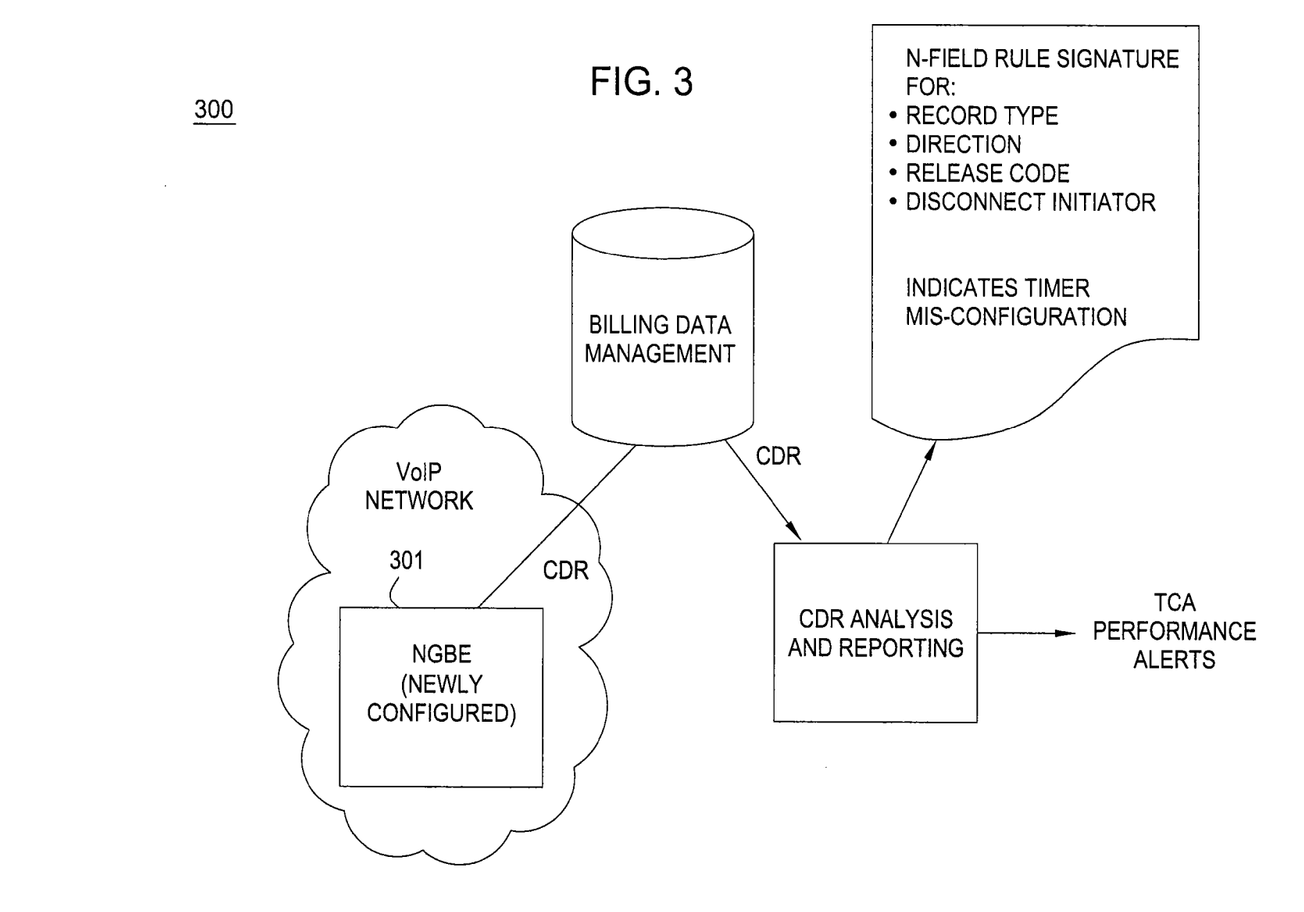
FIG. 3 illustrates an example of node aggregation using n-field rule signature in a VoIP network of the present invention.

FIG. 3 illustrates an example 300 of node aggregation using n-field rule signature in a VoIP network of the present invention. In FIG. 3, a newly configured Network Gateway Border Element (NGBE) 301 has a mis-configured timer and is timing out call requests, thereby preventing calls from being successfully completed. A Network Gateway Border Element (NGBE) is a network element that represents the edge of a VoIP network and serves as a gateway between a VoIP network and a Public Switched Telephone Network (PSTN).

In one embodiment, the CDR analysis and reporting module may use a 4-field rule signature to analyze the received CDRs. The four fields used are:
  record type;
  call direction;
  release code; and
  disconnect initiator.

Upon analyzing the 4-field rule signature, the analyzed data may indicate that an excessive number of cut off calls are being caused by the NGBE 301. For instance, the number of cut off calls exceeds a predefined threshold associated with the 4-field rule signature set by the network operator. An analysis of the signature further indicates that the problem is timer-related. A TCA alert is therefore generated to network operations and investigation by network operations discovers that the NGBE was recently upgraded and a timer value has been incorrectly reset to a default value, which is inappropriate for the operations of the network. The timer can be returned to the correct setting and prevented from being changed in future upgrades. In addition, subsequent monitoring and analysis using this 4-field rule signature may indicate calls are successfully completed.

In this particular node aggregation example, the 4-field rule signature of CDRs from a particular network element may indicate a significant increase in call cut offs. For example, the CDR release code field indicates "time-out" and the disconnect initiator field indicated the particular network element, NGBE 301, was timing out excessively. By aggregating all the cut offs, the root cause of the cut off, e.g., NGBE 301 in this case, can be quickly identified. In turn, the resulting TCA alert will trigger a focused investigation by network operations to quickly reveal that a recent upgrade had reset a particular timer to its default value. The timer can then be reconfigured to the appropriate pre-upgrade value, and the cut off conditions identified by using the 4-field rule signature should be resolved. In addition, future upgrade procedure can be updated to include this configuration adjustment in order to prevent additional NGBEs from being upgraded in this erroneous manner.

Figure 4:
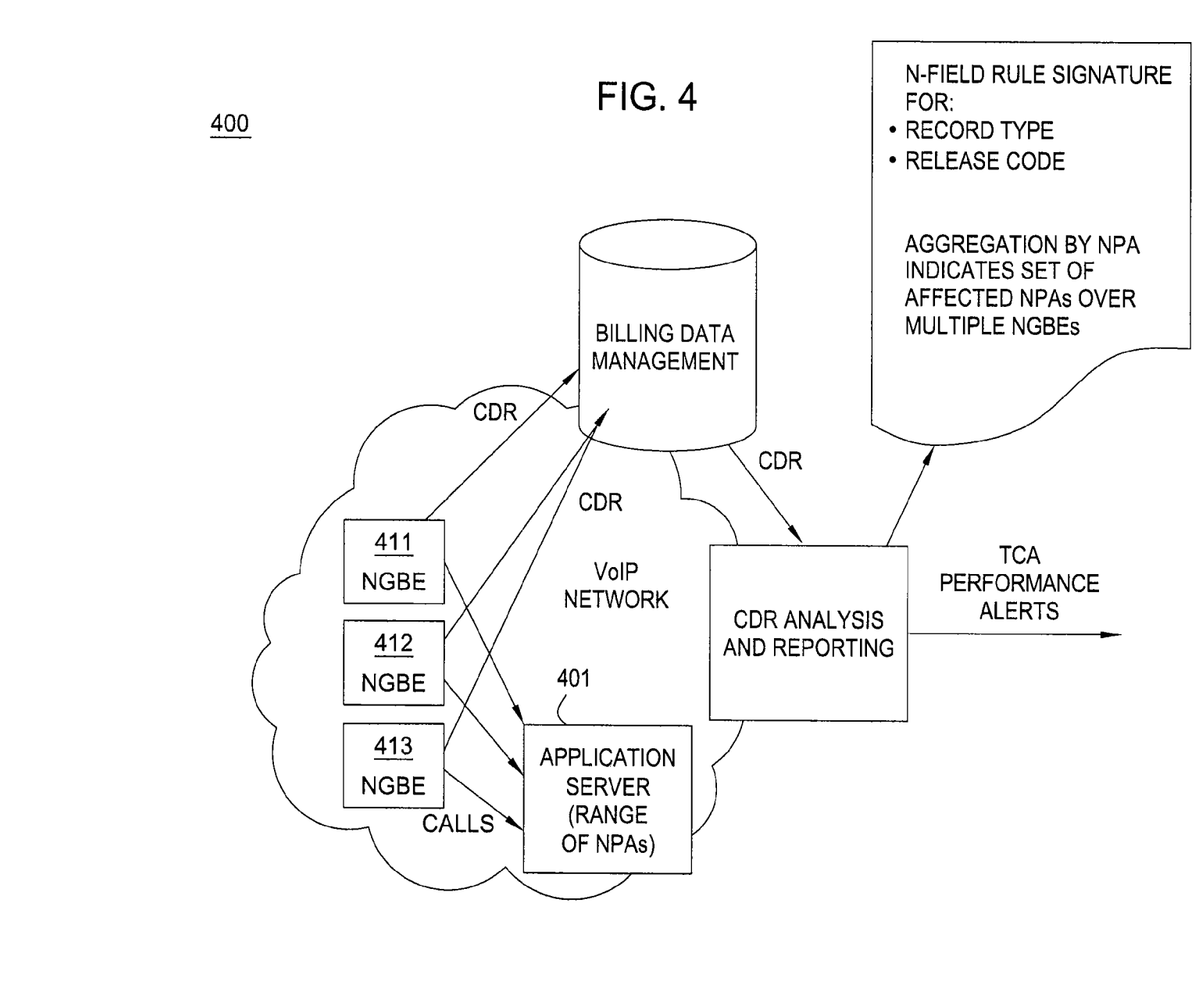
FIG. 4 illustrates an example of Numbering Plan Area (NPA) aggregation using n-field rule signature in a VoIP network of the present invention.

FIG. 4 illustrates an example 400 of a Numbering Plan Area (NPA) aggregation using n-field rule signature in a VoIP network of the present invention. An NPA (Numbering Plan Area) is the area code, e.g., the most significant 3 digits, of the 10 digit North American Numbering Plan phone number. In FIG. 4, application server (AS) 401 processes calls with a narrow range of NPA in the VoIP network, e.g., area code 732. AS 401 is experiencing fault conditions and causes calls to area code 732 not to be completed. An application server is a VoIP network element that comprises specific applications that provide call processing related functions. In this example, the CDR analysis and reporting module uses a 2-field rule signature to analyze the received CDRs. The two fields used are:
  record type; and
  release code.

Upon analyzing the 2-field rule signature, the analyzed data indicates that a number of NGBEs, e.g., NGBEs 411, 412, and 413, generate a large number of blocked calls. The record type value is stop and the release code value indicates a blocked call. In addition, the blocked calls can be aggregated against the NPA, 732, and the blocked call threshold is exceeded indicating the problem is NPA related. In particular, the persistence threshold of blocked calls against NPA, 732, has been exceeded for multiple counts of 5-minute intervals beyond the value specified in the associated successive alert count parameter. Therefore, a TCA alert is generated. The TCA alert will trigger a focused investigation by network operations to quickly reveal that AS 401 is faulty.

In this particular n-field rule NPA aggregation example, a problem with an application server (AS), e.g., AS 401, that processes a narrow range of telephone numbers, with NPA code of 732, suddenly has prevented all calls processed by it from completing. The three border elements, NGBEs 411, 412, and 413, sending calls to this AS will start producing CDRs with the 2-field rule call signature indicating calls were being blocked. The triggered TCA alert based on many blocked calls to the same NPA within a short time interval allows network operations personnel to quickly identify the root cause and to resolve the problem with the faulty AS.

Figure 5:
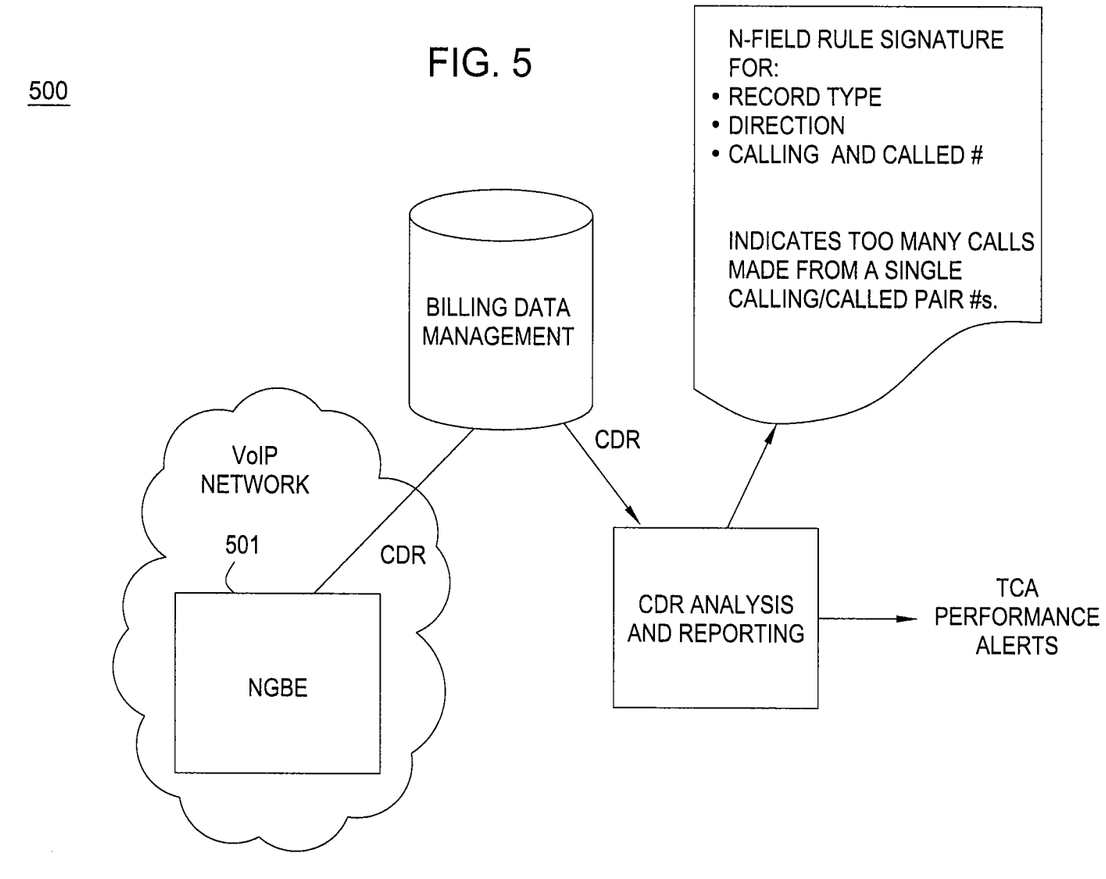
FIG. 5 illustrates an example of call looping identification using n-field rule signature in a VoIP network of the present invention.

FIG. 5 illustrates an example 500 of call looping identification using n-field rule signature in a VoIP network of the present invention. In FIG. 5, a subscriber of the VoIP network has set up a call forwarding loop. For example, the subscriber first sets up call forwarding for all incoming calls to the subscriber's VoIP phone to be forwarded to the subscriber's mobile phone. The subscriber also sets up call forwarding for all incoming calls to the subscriber's mobile phone to be forwarded to the subscriber's VoIP phone. A call forwarding loop is thus set up by the subscriber by mistake. In this example, the CDR analysis and reporting module may use a 4-field rule signature to analyze the received CDRs. The four fields used are:
record type;
call direction;
calling party number; and
a called party number.

By analyzing the 4-field rule signature, the CDR analysis and reporting module may quickly determine that an excessive number of calls with identical calling party number and called party number processed by a particular NGBE, e.g., NGBE 501, in a short time period. In addition to monitoring a fixed calling party number and called party number pair, the record type being monitored is attempt, and the call direction can be "on-net to off-net" and "off-net to on-net". A TCA alert is generated to network operations and investigation will discover the caller uses the call forwarding feature to forward the call from the VoIP phone to the mobile phone and then back to the VoIP phone forming a call loop. As a result, call flow was re-evaluated and re-adjusted by putting a maximum number calls allowed at the NGBE for a fixed calling party number and called party number pair to prevent call looping to continue indefinitely.

Figure 6:
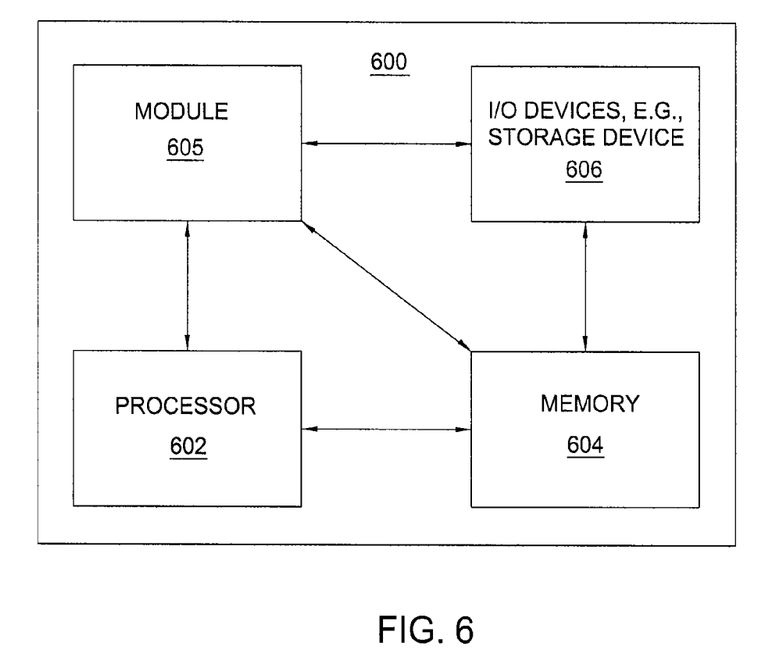
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for detecting network and service performance degradations using CDR, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for detecting network and service performance degradations using CDR can be loaded into memory 604 and executed by processor 602 to implement the functions as discussed above. As such, the present process 605 for detecting network and service performance degradations using CDR (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a network performance problem in a communication network, comprising:
receiving, by a processor, a plurality of call detail records, wherein the plurality of call detail records is associated with a plurality of different calls, wherein each of the plurality of call detail records comprises a plurality of fields;
determining, by the processor, a n-field rule signature from each of the plurality of call detail records, wherein each n-field rule signature comprises n call detail record fields, where n is greater than one; and
analyzing, by the processor, the n-field rule signatures from the plurality of call detail records for detecting the network performance problem, wherein the network performance problem is detected when a threshold number of the plurality of call detail records having a particular n-field rule signature exceeds a threshold, wherein the particular n-field rule signature is associated with the network performance problem, wherein the particular n-field rule signature is one of a plurality of different n-field rule signatures comprising a different combination call detail record fields, wherein each n-field rule signature of the plurality of different n-field rule signatures is associated with a different network performance problem.

2. The method of claim 1, further comprising:
generating an alert when the network performance problem is detected.

3. The method of claim 2, wherein the analyzing the n-field rule signatures comprises associating each of the call detail records with one of a plurality of call categories.

4. The method of claim 3, wherein the analyzing the n-field rule signatures further comprises generating a count for each of the call categories.

5. The method of claim 4, wherein the count comprises: a total call attempts count, a total successful calls count, a total successful call attempts count, a total number of ringing no answer calls count, a total number of busy calls count, a total number of blocked calls count, a total number of cutoff calls count, a total number of undefined blocked calls count, or a total number of undefined cutoff calls count.

6. The method of claim 4, wherein the count is compared to the threshold to detect the network performance problem.

7. The method of claim 6, wherein the count is compared to the threshold in accordance with a single time interval.

8. The method of claim 6, wherein the count is compared to the threshold in accordance with a plurality of time intervals.

9. The method of claim 1, wherein the communication network is a voice over internet protocol network.

10. The method of claim 1, wherein the plurality of fields comprises:
a record type field, a release code field, a call direction field, a disconnect initiator field, a calling party phone number field, or a called party phone number field.

11. The method of claim 3, wherein the one of the plurality of call categories comprises: a call rings with no answer category, a called party is busy category, a call has been blocked with defined cause category, a call has been cut off with defined cause category, a call has been blocked with undefined cause category, a call has been cut off with undefined cause category, or a call has been completed successfully category.

12. The method of claim 1, wherein the call detail records are received in accordance with a configurable time interval.

13. A tangible computer-readable medium storing instructions which, when executed by a processor, cause the processor to perform operations for detecting a network performance problem in a communication network, the operations comprising:
receiving a plurality of call detail records, wherein the plurality of call detail records is associated with a plurality of different calls, wherein each of the plurality of call detail records comprises a plurality of fields;
determining a n-field rule signature from each of the call detail records, wherein each n-field rule signature comprises n call detail record fields, where n is greater than one; and
analyzing the n-field rule signature from the plurality of call detail records for detecting all the network performance problem, wherein the network performance problem is detected when a threshold number of the plurality of call detail records having a particular n-field rule signature exceeds a threshold, wherein the particular n-field rule signature is associated with the network performance problem, wherein the particular n-field rule signature is one of a plurality of different n-field rule signatures comprising a different combination call detail record fields, wherein each n-field rule signature of the plurality of different n-field rule signatures is associated with a different network performance problem.

14. The tangible computer-readable medium of claim 13, further comprising:
generating an alert when the network performance problem is detected.

15. The tangible computer-readable medium of claim 14, wherein the analyzing the n-field rule signatures comprises associating each of the call detail records with one of a plurality of call categories.

16. The tangible computer-readable medium of claim 15, wherein the analyzing the n-field rule signatures further comprises generating a count for each of the call categories.

17. The tangible computer-readable medium of claim 16, wherein the count comprises: a total call attempts count, a total successful calls count, a total successful call attempts count, a total number of ringing no answer calls count, a total number of busy calls count, a total number of blocked calls count, a total number of cutoff calls count, a total number of undefined blocked calls count, or a total number of undefined cutoff calls count.

18. The tangible computer-readable medium of claim 16, wherein the count is compared to the threshold to detect the network performance problem.

19. The tangible computer-readable medium of claim 18, wherein the count is compared to the threshold in accordance with a single time interval.

20. An apparatus for detecting a network performance problem in a communication network, comprising:
a processor; and
a computer-readable medium storing instructions which, when executed by the processor, cause the processor to perform operations, the operations comprising:
receiving a plurality of call detail records, wherein the plurality of call detail records is associated with a plurality of different calls, wherein each of the plurality of call detail records comprises a plurality of fields;
determining a n-field rule signature from each of the call detail records, wherein each n-field rule signature comprises n call detail record fields, where n is greater than one; and
analyzing the n-field rule signatures from the plurality of call detail records for detecting the network performance problem, wherein the network performance problem is detected when a threshold number of the plurality of call detail records having a particular n-field rule signature exceeds a threshold, wherein the particular n-field rule signature is associated with the network performance problem, wherein the particular n-field rule signature is one of a plurality of different n-field rule signatures comprising a different combination call detail record fields, wherein each n-field rule signature of the plurality of different n-field rule signatures is associated with a different network performance problem.

* * * * *